Jan. 20, 1959  F. H. SMITH  2,869,881
ADJUSTABLE FLOATING TOOL HOLDERS
Filed Nov. 27, 1957  2 Sheets-Sheet 1

FREDERICK H. SMITH,
INVENTOR.

BY Donald E. Windle,
ATTORNEY.

Jan. 20, 1959     F. H. SMITH     2,869,881
ADJUSTABLE FLOATING TOOL HOLDERS
Filed Nov. 27, 1957     2 Sheets-Sheet 2

FREDERICK H. SMITH,
INVENTOR.

BY Donald E. Windle.
ATTORNEY.

United States Patent Office 2,869,881
Patented Jan. 20, 1959

2,869,881

ADJUSTABLE FLOATING TOOL HOLDERS

Frederick H. Smith, Dayton, Ohio

Application November 27, 1957, Serial No. 699,390

8 Claims. (Cl. 279—16)

The present invention relates to floating tool holders which are adapted to receive tool bushings carrying tools such as drills, reamers, taps, and other like tools adaptable to machine work, especially in connection with automatic screw machines and the like.

The principal object of the invention is the provision of a tool holder providing therein means permitting the floating action in the adjustment of the tool holder member thereof with relation to the shank member of the device.

A second object of the invention is the provision of means for adjustably securing the tool bushing member with relation to the shank member.

A third object is the provision of a ratchet device permitting hand-adjusting and tightening of the tool bushing holder with relation to the shank member with the elimination of the necessity of using tools in the adjustment of the holder.

Another object of the invention is the provision of a ratchet device incorporated in the tool holder providing means maintaining the adjusted relationship between the shank member and the tool bushing holder.

Other particular objects and advantages of the invention will suggest themselves and become more apparent in the course of the following description, and that which is new will be set forth in the appended claims.

The preferred and most satisfactory manner of carrying out the principles of the invention in a practical and economical manner is shown in the accompanying drawings forming a part of this specification, in which:

Figure 4 is a shank end elevation of the device, taken from line 4—4 of Figure 1, with the same showing, in broken lines, the floating positions between the shank member and the tool bushing member.

Like characters of reference designate like parts throughout the several views of the drawings.

Figure 1:
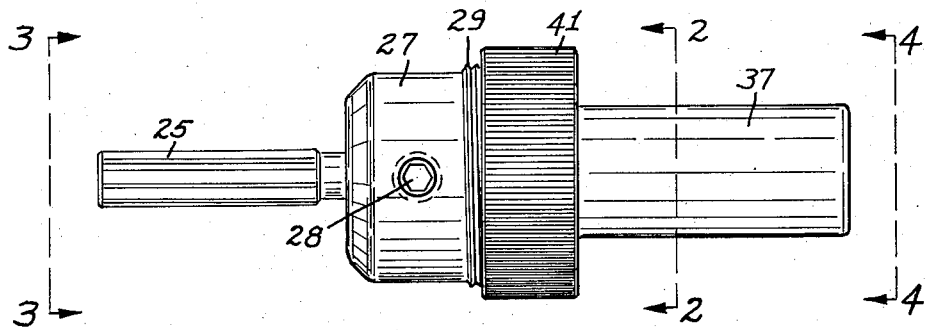
Figure 1 is a side elevation of an adjustable floating tool holder incorporating the features of my invention.
Figure 2:
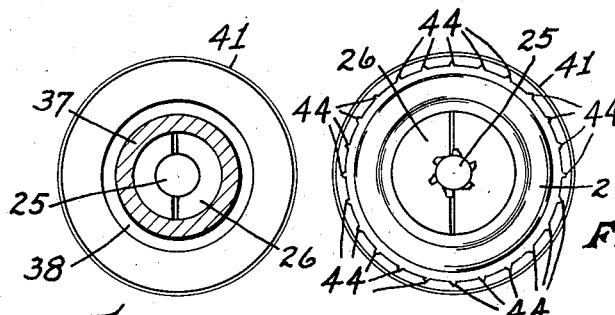
Figure 2 is a cross sectional detail taken on line 2—2 of Figure 1.
Figure 3:
Figure 3 is an elevational view of the tool end of the device, taken from line 3—3 of Figure 1.
Figure 5:
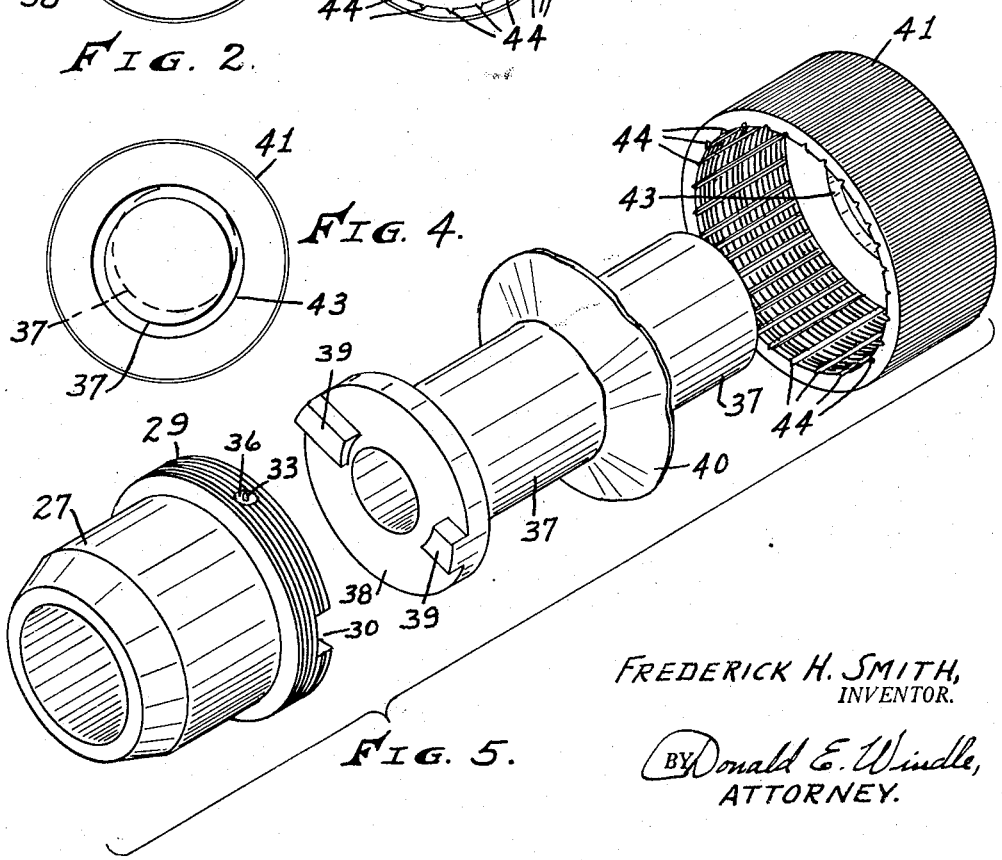
Figure 5 is an isometric detail view of the parts of the device.

In order that the invention and the component parts thereof may be more fully understood and appreciated, I will now take up a detailed description thereof, in which the same will be more fully and comprehensively set forth.

Referring now to the drawings in detail, numerals 25 indicated a tool, in this case, a reamer, which is secured in a tool bushing 26, and with the bushing being removably secured in a tool head member 27 by means of a set screw 28. Threaded flange 29 is provided on the rear end portion of the tool head with there being a channelled slot 30 formed across the rear face of the threaded flange. An inwardly-extending flange 31 provides means forming a stop and limiting the rearward travel of the tool bushing 26.

A bore 32 is formed in the threaded flange 29 for the reception of ratchet pin 33 and its compression spring 34. Ratchet pin 33 has an outstanding flange 35 formed thereon against which retainer member 36 is adapted to engage to prevent dislodgement of the ratchet pin and its spring 34.

A shank 37 is provided with a shank head 38 which is adapted to fit against the rear end of the tool head member 27. The shank head has lugs 39 formed thereon with the lugs being positioned to loosely register with the channelled slots 30 of the tool head. A deformed compression spring 40 is adapted to slip on the shank 37 and bear against the rear face of the shank head 38.

An adjusting collar 41 is provided to connect the tool head 27 and shank member together in adjustable relation. The outer surface of collar 41 is knurled to provide easy gripping by the operator in making the desired adjustments. The inner surface of collar 41 has threads 42 formed therein for threading onto the threaded portion 29 of the tool head member. A bore 43 is formed through the rear wall of the collar for the reception of the shank 37. Ratchet grooves 44 are formed in the threaded surface of the adjusting collar and are adapted to be engaged by the protruding end of ratchet pin 33.

In the assembly of the device shown in the figures, the shank head 38 is abutted against the rear surface of tool head member 27 with lugs 39 being in loose register with the respective channelled slots 30. Spring 40 is brought against the rear surface of shank head 38, after which the adjusting collar 41 is brought onto the shank and threaded onto threads 29 of member 27. Spring 40 provides means maintaining frictional contact between tool head 27 and shank head 38 and prevents the entrance of chips and other foreign matter thereinto. The spring also provides means for varying the degree of frictional contact between the heads to compensate for the weight of the tools being used in the device. If a heavy tool is used, collar 41 is adjusted to provide greater pressure against the spring to provide sufficient friction between the heads to prevent the tool head from slipping downwardly with relation to the shank head. It obviously follows that if a lighter tool is used, collar 41 need not be drawn as tightly against spring 40. As adjusting collar 41 is threaded onto member 27, the same comes into contact with the protruding end of ratchet pin 33. As collar 41 is threaded onto member 27, the spring-urged pin 33 engages each successive ratchet groove 44.

*Operation*

Figure 6:
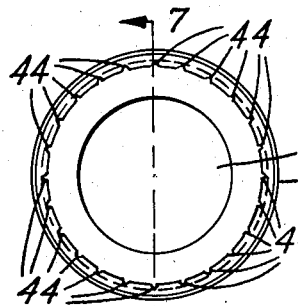
Figure 6 is a detail elevation of the collar member of the device.
Figure 7:
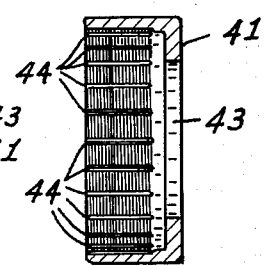
Figure 7 is a detail section through the collar member, taken on line 7—7 of Figure 6.
Figure 8:
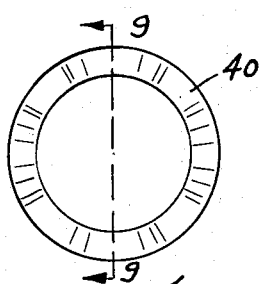
Figure 8 is an elevation of the compression spring member.
Figure 9:
Figure 9 is a detail section through the compression spring, taken on line 9—9 of Figure 8.
Figure 10:
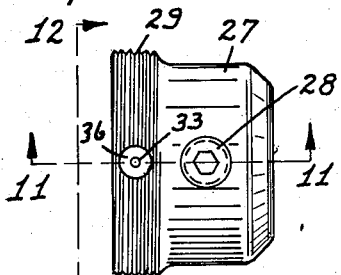
Figure 10 is an elevational view of the tool head member.
Figure 11:
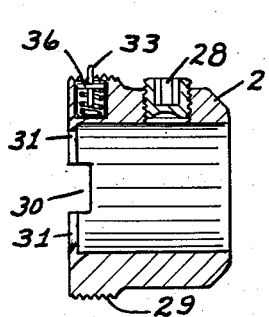
Figure 11 is a longitudinal section through the tool head member, taken on line 11—11 of Figure 10.
Figure 13:
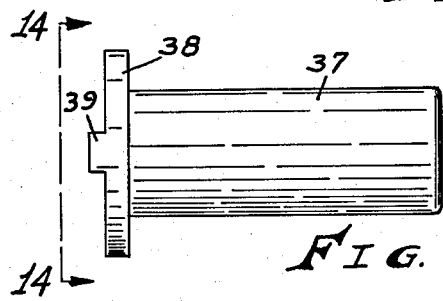
Figure 13 is a side elevation of the shank member.
Figure 12:
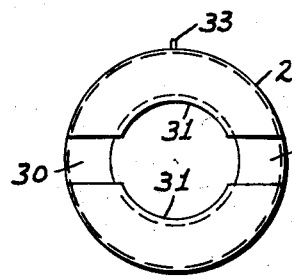
Figure 12 is an end elevation of the tool head member, taken from line 12—12 of Figure 10.
Figure 15:
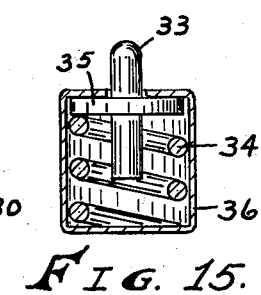
Figure 15 is a section through the spring-urged ratchet pin assembly.
Figure 14:
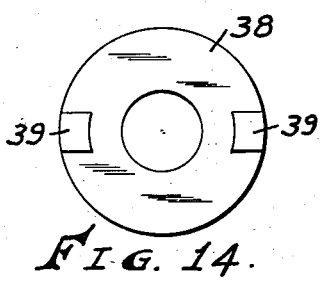
Figure 14 is an end elevation of the shank member, taken from line 14—14 of Figure 13.

When the device is assembled as above described, shank 41 is inserted and secured into a machine (not shown) with the bushing, together with the desired tool being inserted in the tool head member. The bushing is tightened in the tool head 27 by means of set screw 28. The work, having its end center-marked, is brought into contact with the end of the tool. The tool is brought into concentric relation with the work by loosening the adjusting collar 41 sufficiently to permit movement of the tool to its aligned position, after which collar 41 is tightened against spring 40 sufficiently to hold the tool head in its concentric relation with the work. The ratchet pin 33 prevents accidental loosening of the collar with relation to the tool head and provides means permitting a floating action between the shank and the tool head. As clearly seen in Figures 6 and 15, the grooves 44 and the end of the ratchet pin 33 being semispherical, are so shaped that the adjusting collar 41 may be tightened or loosened with equal facility.

It is to be understood that the preferred embodiment of the invention is shown in the drawings and described in this specification, but that I am not to be limited to the specific construction shown and described but that minor changes may be made therein insofar as the changes may fall within the scope of the appended claims.

Having now shown and described the invention, what I claim and desired to secure by Letters Patent of the United States, is:

1. In an adjustable floating tool holder, a tool head member secured in adjustable floating relation with a shank member by means of an adjusting collar, a ratchet pin carried by the tool head member and being adapted to engage ratchet grooves formed in the adjusting collar, and a compression spring located between the shank member and the adjusting collar.

2. In an adjustable floating tool holder, a tool head member secured in frictional adjustable floating relation with a shank member by means of an adjusting collar threaded onto the tool head member, with a compression spring providing frictional engagement between the tool head member and the shank member, with the adjusting collar providing means applying pressure against the compression spring, and a ratchet pin carried by the tool head member with the same being adapted to engage ratchet grooves formed in the adjusting collar to maintain adjustment between the tool head member and the adjusting collar.

3. An adjustable floating tool holder comprising in combination, a tool head member having one end thereof threaded, a ratchet pin carried by the tool head member and located in the threaded portion thereof, a shank member having a head adapted to frictionally engage the tool head member, an adjusting collar threaded onto the tool head member and including the head of the shank member, a compression spring positioned between the head of the shank member and the adjusting collar, ratchet grooves formed in the adjusting collar, and with the ratchet pin being adapted to engage the ratchet grooves and maintain adjustment of the adjusting collar and the tool head member.

4. In an adjustable floating tool holder comprising a tool head member having a shank head in frictional engagement therewith, a compression spring bearing against the shank head and applying pressure thereagainst in the direction of the tool head member, an adjusting collar encircling the shank head and being threaded onto the tool head member, with the adjustment of said adjusting collar against the compression spring governing the degree of friction present between the tool head member and the shank head, and with means located in the tool head member adjustably fixing the location of the adjusting collar with relation to the tool head member.

5. An adjustable floating tool holder as set forth in claim 4, a spring-urged ratchet pin located in the tool head member and being adapted to engage ratchet grooves formed in the adjusting collar, and with the spring-urged ratchet pin providing frictional locking means between the tool head member and the adjusting collar.

6. An adjustable floating tool holder including a tool head member secured in a frictionally adjustable floating relation with a shank member by means of an adjusting collar threaded onto the tool head member, a compression spring providing frictional engagement between the tool head member and the shank member, the adjusting collar providing means applying pressure against the compression spring, ratchet grooves formed in the adjusting collar, and a resiliently biased ratchet pin carried by the tool head member with the same being adapted to engage the ratchet grooves formed in the adjusting collar to maintain adjustment between the tool head member and the adjusting collar independently of the shank member, said pin having a semi-spherical groove engaging portion so that the collar may be tightened or loosened with equal facility.

7. An adjustable floating tool holder comprising, in combination, a tool head member having one end thereof threaded, the ratchet member having a semi-spherical contact area, said ratchet member being carried by the tool head member and located in the threaded portion thereof, a shank member having a head adapted to frictionally engage the tool head member, an adjusting collar threaded onto the tool head member and engaging the head of the shank member, a compression spring positioned between the head of the shank member and the adjusting collar, ratchet grooves formed in the adjusting collar with the ratchet member being adapted to engage the ratchet grooves and maintain adjustment of the adjusting collar and the tool head member, said adjusting collar and grooves cooperating with the semi-spherical contact area of the ratchet member to permit tightening and loosening of the collar with equal facility independently of the shank member.

8. An adjustable floating tool holder comprising a tool head member having a shank head in frictional engagement therewith, a compression spring bearing against the shank head and applying pressure thereagainst in the direction of the tool head member, an adjusting collar member encircling the shank head and being threaded onto the tool head member with the adjustment of said adjustment collar against the compression spring governing the degree of friction present between the tool head member and the shank member, a resiliently biased ratchet means having a semi-spherical contact surface mounted in one of said members, and grooves across the threads of the other member, the semi-spherical surface of the ratchet means engaging the grooves to permit relative adjustment of either member in either direction with equal facility independently of the shank head.

References Cited in the file of this patent
UNITED STATES PATENTS

| | | |
|---|---|---|
| 579,547 | Perry | Mar. 23, 1897 |
| 1,854,048 | Lauster | Apr. 12, 1932 |
| 1,907,447 | Schiltz | May 9, 1933 |
| 2,768,832 | Smith | Oct. 30, 1956 |